United States Patent [19]

Matthey et al.

[11] 4,236,103
[45] Nov. 25, 1980

[54] CONTROL CIRCUIT FOR A DIRECT CURRENT MOTOR

[75] Inventors: Jacques Matthey, Geneva; Marcel Torre, Meyrin; André D. Millenet, Geneva, all of Switzerland

[73] Assignee: Mefina S.A., Fribourg, Switzerland

[21] Appl. No.: 962,704

[22] Filed: Nov. 21, 1978

[30] Foreign Application Priority Data

Dec. 1, 1977 [CH] Switzerland ............... 14681/77

[51] Int. Cl.³ ............................................. H02P 5/16
[52] U.S. Cl. .............................. 318/345 D; 318/349; 318/505; 318/514; 318/442
[58] Field of Search ............... 318/248, 440, 442, 500, 318/514–516, 345 C, 345 D, 345 H, 349, 505, 506; 323/36; 361/33

[56] References Cited

U.S. PATENT DOCUMENTS

| | | | |
|---|---|---|---|
| 2,157,417 | 5/1939 | Kneisley | 361/33 |
| 3,416,059 | 12/1968 | Lagier | 318/514 |
| 3,454,865 | 7/1969 | Ellert | 323/36 |
| 3,539,892 | 11/1970 | Lindberg | 318/345 H |
| 3,742,337 | 6/1973 | Digneffe | 318/345 D |

OTHER PUBLICATIONS

Lytel, A., *Electronic Motor Control*, Howard W. Sams & Co., 1964, pp. 20–21.

*Primary Examiner*—David Smith, Jr.
*Attorney, Agent, or Firm*—Emory L. Groff, Jr.

[57] ABSTRACT

A control circuit for a direct current electric motor including a rectifying bridge for supplying the motor with direct current and a regulating circuit including a triac, the energizing angle of which is determined by a capacitor connected in series with a resistance network. An energy limiting circuit is provided including a resistance connectable in series with the resistance network and the capacitor when the voltage exceeds a predetermined value so that the motor can be operated on a 110 V or a 220 V supply.

9 Claims, 2 Drawing Figures

CONTROL CIRCUIT FOR A DIRECT CURRENT MOTOR

The present invention relates to a control circuit for a direct current motor, having separate excitation by permanent magnets. Such devices are well known and used especially for control of a motor of an electric sewing machine.

It is often useful to provide a sewing machine which can be connected to different voltage networks. To this end, there is generally provided a manual voltage switch operated by the user. This switch operates directly on the fixed winding of the motor, or on the transformer windings, or even to connect a resistance, possibly in series with a diode, or in series with the motor.

Such arrangements, however, are inconvenient and it is possible to forget to switch over, which can result in a deterioration of the motor, or the speed adjustment.

According to the present invention there is provided a control circuit for a direct current electric motor having separate excitation by permanent magnets, comprising a rectifying bridge for supplying the motor with direct current, a regulating assembly comprising a triac in an alternating arm of the rectifying bridge, the energizing angle of the triac being determined by a capacitor connected in series with a resistance network, and means for limiting the energy supplied to the motor as a function of the value of the feed voltage in the alternating arm of the rectifying bridge, including a supplementary resistance adapted to be connectable in series with the resistance network when the said voltage exceeds a predetermined value.

The present invention will be described further, by way of example, with reference to the accompanying drawings, in which.

Figure 2:
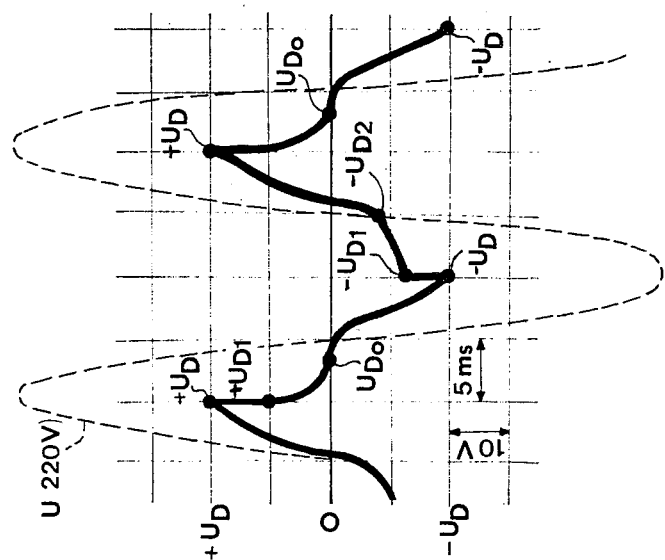
FIG. 2 is a diagram of the voltage at the terminals of the capacitor $C_4$ of the circuit of FIG. 1.

The control device described is applied to the motor of a sewing machine which can be fed with 110 V or 220 V.

From the terminals R and N, connected to the mains supply, there is fed a circuit of an illuminating lamp L connected to terminal 3 in series with a switch $I_L$. This circuit is independent of the control circuit of a motor M having separate excitation by permanent magnets functioning under rectified current. The motor M is connected via terminals 4 and 5 to the two output terminals, $K_1$ which is negative, and $K_2$ which is positive, of a bridge rectifier comprising four diodes $D_1$, $D_2$, $D_3$ and $D_4$.

One of the alternative inputs J of this rectifier is connected to the terminal N via a switch $I_M$, with an incorporated test lamp 9 connected to terminal 8, and via a deparasitising coil $L_1$. The other input F of the rectifier is connected to the terminal R via a triac T and a resistance $R_2$. The control electrode of the triac T is connected across a diac D to a terminal H of a capacitor $C_4$, the other terminal of which is connected to the terminal F of the rectifier.

A diode $D_6$ and a resistance $R_4$, in series with the diode $D_6$, are connected in parallel with the capacitor $C_4$, the anode of the diode $D_6$ being connected to the terminal H.

The voltage on the terminal H is determined by the capacitor $C_4$ and by a resistance network $R_T$. When a switch $S_3$ is closed, this network $R_T$ comprises starting from the terminal H, an adjustable resistance $T_r$ for compensation of the tolerances of the components, a variable resistance $R_v$ in parallel with this resistance $T_r$ and the curser of which is accessible from outside the sewing machine, a residual resistance $R_5$ for limiting the control current, in series with the resistances $T_r$ and $R_v$, followed by four resistances $R_{10}$, $R_9$, $R_8$ and $R_7$, in series forming a rheostat and presenting contact terminals $P_7$, $P_6$, $P_5$, $P_4$ and $P_3$. These terminals are disposed in a manner so as to be sequentially contacted by a bar B displaceable under the action of pneumatic members P and A, for controlling the speed of the motor.

The terminal $P_3$ can be connected via the bar B and of the terminal $P_1$ to the supply terminal R. The terminal $P_2$ connected to the supply terminal R across the resistance $R_2$, is disposed in a manner to be put in contact with the bar B when this latter starts its displacement, has already contacted the terminal $P_1$, the terminals $P_2$ to $P_7$ being successively contacted in decreasing order of the total resistance $R_T$, this order obviously being reversed when the bar B returns to its rest position shown in the drawing.

The control circuit also comprises a diode $D_5$ in series with a resistance $R_3$ connected between the terminal H and the positive terminal $K_2$ of the rectifier, the anode of the diode $D_5$ being connected to the terminal H.

In parallel with the switch $I_M$ there is connected a voltage switching circuit $11_A$, which comprises, in series, a diode $D_7$, a relay coil $R_L$, an adjustable resistance $T_{rb}$ and a resistance $R_{12}$. A capacitor $C_6$ is connected in parallel with the relay coil $R_L$ to ensure a suitable wave rate for the excitation current of the relay.

The adjustable resistance $T_{rb}$ permits the precise adjustment of the switching level of the relay, this resistance being short-circuited by a switch $S_1$ when the relay $R_L$ has switched.

This relay $R_L$ also controls the switch $S_3$ which, when it is open, places in series with the resistance $R_T$, a supplementary adjustable resistance $R_a$ and a resistance $R_{11}$, a diode $D_8$ being connected in parallel with resistance $R_{11}$.

The relay $R_L$ also controls a switch $S_2$ which, when it is closed, short-circuits a resistance $R_{17}$ in series with the motor M.

The circuit comprises moreover a certain number of deparasitising members, such as a $\pi$ filter comprising the coil $L_1$ in series with the supply line N and two capacitors $C_3$ and $C_1$ respectively connected to the two ends of the coil $L_1$ and to the other supply terminal R, a deparasitising capacitor $C_2$ also being connected between this terminal R and the body of the motor. High frequency inductances $L_2$ and $L_3$ are provided on the feed lines of the motor.

An RC circuit comprising a resistance $R_6$ in series with a capacitor $C_5$, is connected in parallel with the triac T to protect, amongst other things, the triac T against over-voltages during its functioning.

A resistance $R_1$ is connected between the terminals R and N to ensure the discharge of the condensers $C_1$ and $C_3$ when the plug is withdrawn from its socket.

Figure 1:
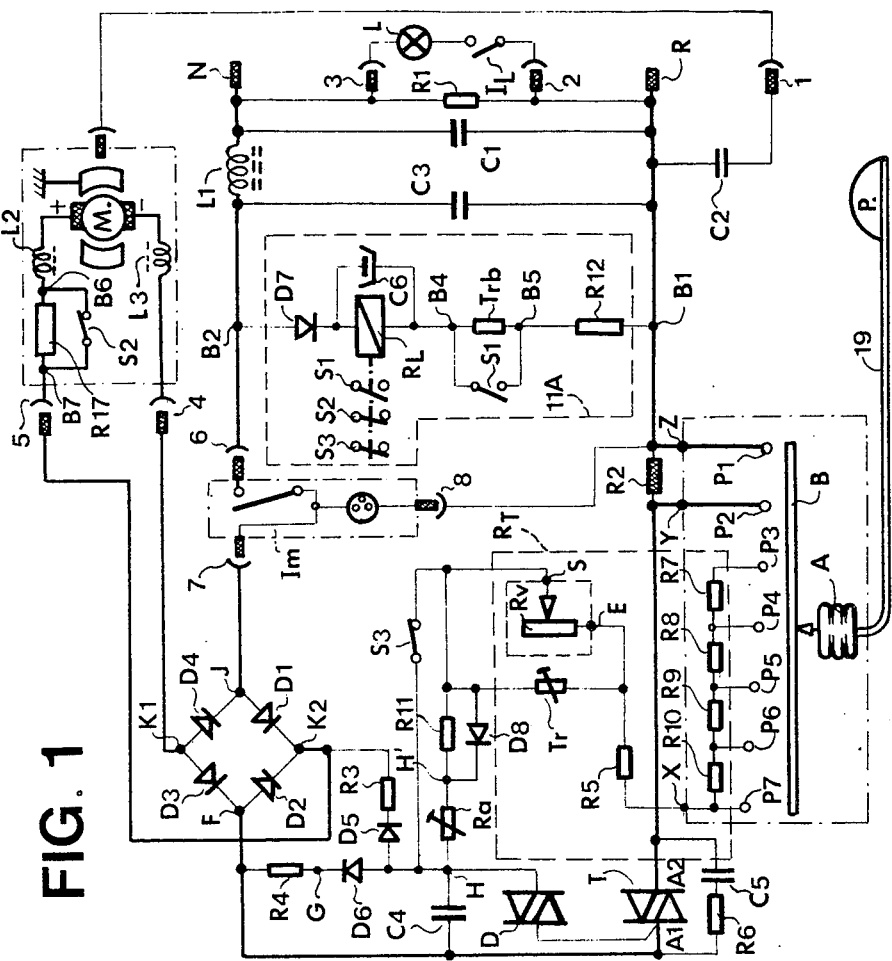
FIG. 1 shows an electric motor control circuit.

The functioning is described hereunder:

The sewing machine is assumed ready for use with the switch $I_M$ closed. The machine is fed with 110 V, the switches $S_2$ and $S_3$ are closed and the switch $S_1$ is open, the voltage is not sufficient for switching the relay $R_L$. As long as the user does not apply force on the control member P, the bar B is in the position shown in FIG. 1 and the terminals $P_1$ to $P_7$ are free. The control circuit of the triac T is open.

As soon as the user applies a force on the control member P, the bar B is displaced and comes into contact with the terminal $P_1$, thus connecting itself to the supply voltage. Then the bar B meets the terminal $P_2$, short-circuiting the resistance $R_2$, and then the terminal $P_3$, thus feeding the control circuit of the triac T. This progressive manner of applying a voltage to the circuit and vice versa has the object of avoiding sparking at the contacts $P_1$ and $P_2$.

The control circuit of the triac T is thus fed across the resistance network $R_T$, the total resistance being variable, and the capacitor $C_4$ and the diac D. The energizing angle of the triac T depends on the speed of variation of the voltage at the terminals of the capacitor $C_4$.

The more the resistance $R_T$ reduces, the more rapid is the charging of the capacitor $C_4$, thus the diac D, and consequently the triac T, will be energized more rapidly. The conduction time of the triac T will increase and the motor M will receive more power.

The diode $D_6$ and a careful choice of the resistance $R_4$ will permit starting the motor at speeds which are as low as permitted by the friction forces of the machine, which has obvious advantages compared to the known bidirectional releasing members having asymmetric voltages, which cause rapid and sudden variations of the speed. During the positive half-cycle the resistance $R_4$ limits the charging of the capacitor $C_4$, by taking part of the current in the return circuit, the diode $D_6$ being conducting, so that the capacitor $C_4$ does not attain the positive control voltage of the diac D. During the negative half-cycle, the diode $D_6$ is blocked and there is no current at all, so that the capacitor $C_4$ attains at a given instant the negative control voltage of the diac D. The triac T thus only conducts during the negative half-cycles and this for fairly big values of $R_T$, which permits a low working of the motor.

The diode $D_5$ and the resistance $R_3$ associated with the e.m.f. delivered by the motor M during the period of non-conduction of the triac T form a good counter-reaction at low speeds. For a given speed setting of the motor, an increase of the resistance couple of the motor is translated as a reduction of the speed of the motor and a reduction of the e.m.f. delivered by the motor during the non-conductive period of the triac T.

The electromotive voltage appearing at the terminal $K_2$ is in opposition with the voltage appearing at the terminal H, so that when there is a reduction of the electromotive voltage, there is an increase in the charging current of the capacitor $C_4$, through the members $D_5$, $R_3$. The capacitor $C_4$ will be charged to a lower voltage during the positive half-cycles and will more rapidly attain the negative control voltage of the diac D during the negative half-cycles. The triac T will thus be energized more rapidly, its conduction time will be longer and the motor M will receive more power. In a counter-reaction circuit such as has been described, the electromotive voltage delivered by a direct current motor having separate excitation by permanent magnets does not require, by virtue of its high value, any amplification.

The adjustable resistance $T_r$ is adjusted so as to ensure a predetermined motor speed, whatever the tolerances of the components of the circuit, when all the resistances $R_7$ to $R_{10}$ are short-circuited and the resistance $R_v$ is adjusted on its maximum value, corresponding to a minimum speed.

When the machine is connected on the 220 V network, the current which is established across the circuit $11_A$ is sufficient to switch the relay $R_L$. The switches $S_2$ and $S_3$ open and the switch $S_1$ closes, short-circuiting the adjustable resistance $T_{rb}$. This permits using low value and low price resistance, but this arrangement is not indispensible.

The resistance $R_{17}$ is then found in series with the motor M with the object of limiting the current, particularly during the starting or when the motor is blocked, so as to avoid partial demagnetization of the permanent magnets. In effect in the case of a 110 V motor fed under 220 V, operation of the motor is obtained by an adjustment of the energizing angle of the triac T and the motor receives rectified current pulses which could be too big, from which arises the need to limit the current to a lower value than that provoking the demagnetization of the magnets of the motor.

The resistance $R_{17}$ can obviously be replaced by another current limiting circuit.

So that a 110 V motor fed with 220 V can operate in the same manner as with 110 V, it is necessary that the conduction time of the triac T is reduced. In this case, the object is attained by the addition of a resistance $R_a$.

This resistance $R_a$ limits the charging and discharging current of the capacitor $C_4$, increases the blocking time of the triac T and consequently reduces its conducting time.

We have seen that to obtain a gentle starting of a motor fed with 110 V, an asymmetric charge of the capacitor $C_4$ has been created by connecting, in parallel, the resistance $R_4$ in series with the diode $D_6$. To have a counter-reaction in a low speed condition of the motor, a second asymmetry formed by the resistance $R_3$ and the diode $D_5$ creates a diversion of charging current of the capacitor $C_4$ depending on the speed of the motor.

At 110 V, when the motor operates normally, the effect of these asymmetries become negligible and the motor receives similar current pulses every half period. In contrast, at 220 V these arrangements provide that the motor receives much larger current pulses with a frequency half that at 110 V. These large current pulses wear the brushes of the motor M more rapidly and provoke a poor output of the motor M.

It is for this reason that a counter-asymmetry, formed of resistances $R_a$ and $R_{11}$ and of the diode $D_8$, has been added during the use of the 220 V network. This counter-asymmetry varies, in fact augments, the charging time of the capacitor $C_4$ and thus operates on the energizing angle of the triac T in such a manner that, in combination with the asymmetries $R_4$, $D_6$ and $R_3$, $D_5$, the motor is fed at low speed, by phase control of the negative half-cycle and by phase control in a symmetrical manner of the negative and positive half-cycles when the motor is in fully normal power.

The motor M will thus receive current impulses of a lower intensity with respect to those which it would receive without the members $R_a$, $R_{11}$, $D_8$ when it is fed under 220 V. By adjusting $R_a$, one can regulate the energy supplied to the motor in such a manner that the mechanical energy output is the same as when functioning under 110 V, as previously described.

In FIG. 2, there is shown the variations of the voltage at the terminal H of the capacitor $C_4$, as a function of the voltage of the network for a motor at full power.

For obtaining, at normal full power of the motor, substantially equal current pulses every 10 ms, i.e. for each cycle, the members $R_4$, $D_6$ and $R_a$, $R_{11}$, $D_8$ are determined in a manner that the capacitor $C_4$ attains the releasing voltages $+U_D$ and $-U_D$ of the diac D every 10 ms. When the voltage of the point H attains the value $+U_D$, the capacitor $C_4$ discharges suddenly up to a value $+U_{D1}$ across the diac D and the triac T, then it continues its discharge across $R_4$, $D_6$. The capacitor $C_4$ is discharged before the end of the positive half-cycle.

From the beginning of the negative half-cycle, the capacitor $C_4$ charges in the other direction across $R_T$, $R_{11}$, $R_a$. When the voltage at the point H attains the value $-U_D$, the capacitor $C_4$ discharges suddenly up to a value $-U_{D1}$ across the diac D and the triac T, then it continues to discharge across $R_a$, $D_8$, $R_T$ and attains a value $-U_{D2}$ at the moment where the cycle becomes positive again. From this instant, the capacitor $C_4$ starts to be charged again, in the other direction, across $R_T$, $D_8$, $R_a$ until the voltage at the point H attains the value $+U_D$.

It can be seen that this asymmetry of charging and discharging times of the capacitor $C_4$ permits release of the diac D, and thus the triac T, at low working at each negative half cycle, permitting operation of the motor at as low a speed as desired, always responding to the necessity of limiting the energy furnished to a 110 V motor fed under 220 V.

One could of course in a first time period only use the resistance $R_a$ to create a variation of time for charging and discharging the capacitor $C_4$ when switching the feed voltage; in this case, there would be no asymmetry. One could also, instead of and in place of the resistance $R_a$, or in a complimentary manner, connect, when switching the voltages, a supplementary capacitor in parallel with the capacitor $C_4$, which would likewise vary the charging time, the capacitance being larger.

It is evident that a limitation such as has been attained by the members $R_a$, $R_{11}$ and $D_8$ can be used without the co-operation of the asymmetrical members $R_4$ $D_6$ and $R_3$ $D_5$ described above. Only the combination of all these members give very advantageous results in the case of the control of the electric sewing machine motor it is useful to be able to have a very low speed and high speed regulation of the working.

It is obvious that such a limitation is not applicable only to sewing machines, but to all controls of direct current motors having separate excitation by permanent magnets, fed by the network across a triac and a rectifying bridge.

We claim:

1. A control circuit for a direct current electric motor having separate excitation by permanent magnets, comprising a full wave rectifying bridge for supplying the motor with direct current; a resistance network comprising a manually controllable variable resistance for controlling the speed of the motor, a regulating assembly comprising a triac responsive to both positive and negative current directions, a capacitor connected to said rectifying bridge in series with said resistance network, said triac connected to an alternating arm of the rectifying bridge, the triac having an energizing angle determined by said capacitor connected in series with said resistance network; and means for limiting the energy supplied to the motor through said triac as a function of the value of the feed voltage in the alternating arm of the rectifying bridge, including a supplementary resistance connectable in series with the resistance network when the said voltage exceeds a predetermined value, said means comprising a switch in said control circuit responsive to the value of the feed voltage for effectively placing said supplementary resistance in or out of the control circuit.

2. A circuit as claimed in claim 1, the said energy limiting means additionally including a resistance connected in parallel with a diode, these two members being connectable in series with the resistance network and the supplementary resistance when the said voltage exceeds the said predetermined value.

3. A circuit as claimed in claim 2, including a current limiting circuit comprising a resistance connectable in series with the motor when the said voltage exceeds the said predetermined value.

4. A circuit as claimed in claim 2, wherein said switch connected in a manner to short-circuit the said energy limiting means as long as the said voltage does not reach the said predetermined value.

5. A circuit as claimed in claim 3, including a switch connected in a manner to short-circuit the current limiting circuit as long as the voltage does not attain the said predetermined value.

6. A circuit as claimed in claim 5, including a control circuit for the commutation of the switches responsive to the value of the feed voltage in the alternating arm of the rectifying bridge.

7. A circuit as claimed in claim 6, in which the said control circuit comprises a relay, the two switches presenting contacts controlled by the relay, the switching voltage of which relay being equal to the said predetermined value.

8. A circuit as claimed in claim 7, in which the said control circuit comprises an adjustable resistance permitting the precise determination of the switching voltage of the relay.

9. A circuit as claimed in claim 8, in which a switch is connected in parallel with the adjustable resistance, this switch being controlled by the relay in a manner to short-circuit the adjustable resistance when the said voltage exceeds the said predetermined value.

* * * * *